C. H. GUARD.
Fifth Wheel.
No. 43,640.
Patented July 26, 1864.
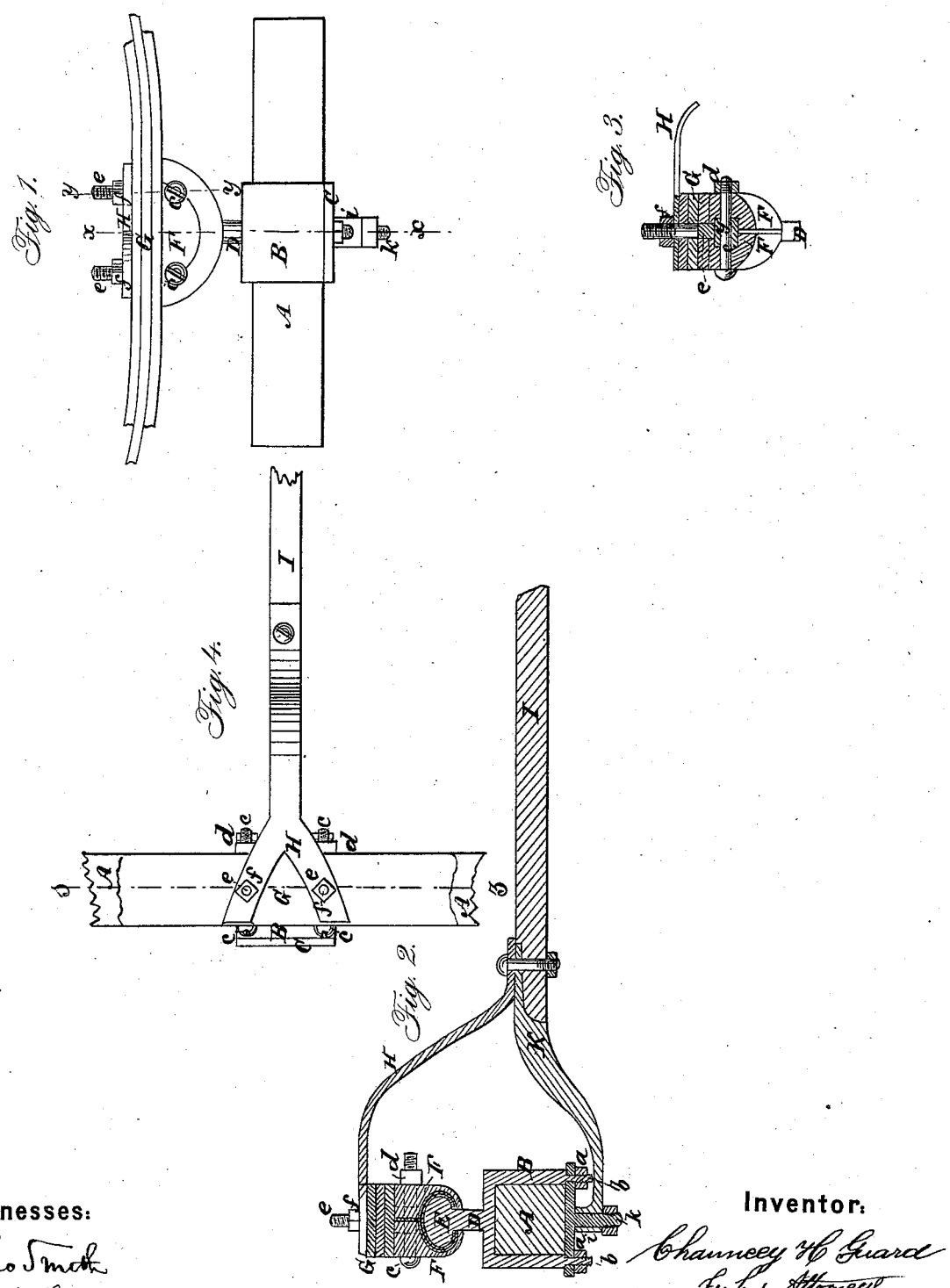
Witnesses:
A. Tho. Smith
Gilbert B. Fowler
Inventor:
Chauncey H. Guard
By his Attorneys
Robbins & Burt

UNITED STATES PATENT OFFICE.

CHAUNCEY H. GUARD, OF TROY, NEW YORK.

IMPROVEMENT IN COUPLINGS FOR CARRIAGES.

Specification forming part of Letters Patent No. 43,640, dated July 26, 1864.

*To all whom it may concern:*

Be it known that I, CHAUNCEY H. GUARD, late of Troy, in the county of Rensselaer and State of New York, and now a private in Company E, One hundred and fortieth Regiment New York Volunteers, have invented certain new and useful Improvements in the Manner of Coupling Carriages, &c.; and I do hereby declare that the following is a full, clear, and exact description thereof, reference being had to the accompanying drawings, forming a part of this specification, of which—

Figure 1 is a front elevation of a portion of a carriage embracing a part of the front axle-tree thereof, my improved ball-and-socket coupling, and the lower leaf of an elliptic spring. Fig. 2 is a vertical central section taken in the line $x$ $x$ of Fig. 1. Fig. 3 is a section in the line $y$ $y$ of Fig. 1. Fig. 4 is a top or plan view showing more clearly the shape of the forked brace H.

Similar letters of reference indicate like parts in the several figures.

It is well known that many evils attend the use of the customary "fifth wheel" or "turning circle" in four-wheeled vehicles, arising from the great and varying friction of the several parts thereof, the penetration of dust between their rubbing surfaces, and the great wear and tear consequent thereupon. I obviate these evils by my invention; and to this end I employ in place of the fifth-wheel, such an arrangement as is illustrated in the accompanying drawings, the construction and operation of which I will proceed to describe.

At the center of the front axle-tree, A, of a four-wheeled vehicle is placed the clip B, firmly secured in position by means of the cross-piece C, which is forced home by the nuts $a$ $a$ working upon the screw-shanks $b$ $b$, projecting from the vertical sides of the clip. From the upper surface of this clip B rises the shank D, upon the upper end of which is formed the ball E, which works in a socket formed for its reception in the segments F F, as clearly shown in Fig. 2. These segments closely embrace the ball E, and are retained in position by means of the through-bolts $c$ $c$ and nuts $d$ $d$. The upper surface of the segments F F forms a seat for the spring, upon which the front portion of the wagon or carriage body rests, as shown in Fig. 1, wherein G represents the lower leaf of an elliptic spring resting upon the segments F F, and secured thereto by the bolts $e$ $e$ and nuts $f$ $f$. These bolts $f$ $f$ are each provided with an eye, $g$ $g$, Fig. 3, which is received and retained in suitable recesses for that purpose provided in the segments F F, and through these eyes pass the bolts $c$ $c$, thus firmly uniting the segments with each other and with the spring G. The bolts $e$ $e$ also receive the ends of the forked brace H which extends from the reach I to the top of the spring-plates G. (See Figs. 2 and 4.)

From the under side of the cross piece C descends the shank $k$, which receives the eye $i$, formed upon the end of the curved portion K of the reach I. A thin sheet of india rubber or other suitable packing may be interposed between the segments F F for the purpose of excluding all dust from the interior of the apparatus, and a collar of similar material may be advantageously employed for the same purpose to surround the shank D at the point where it is embraced by the segments F F. The ball E is coated with Babbitt metal, and the socket in which it plays is lined with the same material, for the purpose of imparting to these parts a smooth surface and diminishing the friction thereof.

The operation of this coupling is simple and obvious. The segments F F are held rigidly by means of the forked brace H, extending from the reach I, and secured to the segments by means of the bolts $e$ $e$, while the axle A has free play from right to left, turning upon the ball E and shank K, and thus every function of the fifth-wheel is fulfilled, while the evils attendant upon its use are obviated. When the load in the vehicle is so placed as that it bears more upon one side than upon the other, the friction and strain of the socket upon the ball is divided between the upper surface of that portion of the ball nearest adjacent to the preponderance of the weight and the under surface of that portion most remote therefrom.

Having thus fully described my improved coupling device, what I claim therein as new, and desire to secure by Letters Patent, is—

1. The combination of the clip B, ball E, and segments F F in such manner that the said ball and segments shall perform the functions of the turning circle of the vehicle, while the said segments afford a seat for the reception of the spring G.

2. Combining the segments F F, spring G, and forked brace H with each other by means of the bolts c c and e e, formed and arranged as herein represented and described.

Signed and sealed on this 25th day of September, 1863.

CHAUNCEY H. GUARD.

Witnesses:
 CHARLES I. LEWIS,
 JOHN W. BROWNELL.